United States Patent [19]

Borello

[11] Patent Number: 5,363,245
[45] Date of Patent: Nov. 8, 1994

[54] VEHICLE REARVIEW MIRROR

[75] Inventor: Antonio Borello, Settimo Torinese, Italy

[73] Assignee: Gilardini S.p.A., Turin, Italy

[21] Appl. No.: 969,421

[22] Filed: Oct. 30, 1992

[30] Foreign Application Priority Data

Oct. 31, 1991 [IT] Italy .......................... T091 U 000272

[51] Int. Cl.⁵ ............................................... G02B 7/182
[52] U.S. Cl. ....................................... 359/872; 248/476
[58] Field of Search ................. 359/871, 872; 248/466, 248/469, 475.1, 476

[56] References Cited

U.S. PATENT DOCUMENTS

| | | | |
|---|---|---|---|
| 3,799,658 | 3/1974 | Pignatelli | 359/844 |
| 4,253,633 | 3/1981 | Takagawa | 248/475.1 |
| 4,394,066 | 7/1983 | Sharp | 359/872 |
| 4,613,107 | 9/1986 | Vitaloni | 248/476 |
| 4,991,814 | 2/1991 | Schmidt et al. | 359/872 |
| 4,998,812 | 3/1991 | Hou | 359/872 |
| 5,268,797 | 12/1993 | Santo | 359/872 |

Primary Examiner—Scott J. Sugarman
Assistant Examiner—Thomas Robbins
Attorney, Agent, or Firm—Kane, Dalsimer, Sullivan, Kurucz, Levy, Eisele and Richard

[57] ABSTRACT

A vehicle rearview mirror comprising a cup-shaped body, the front edge of which defines a square frame housing a reflecting plate; and a cylindrical arm extending from the body and one end of which is fitted to the vehicle door. At one corner of the frame, the body presents a flat beveled portion inclined 45° in relation to the adjacent sides of the frame, and mating with a flat end wall of the arm. The body is adjustable in relation to the arm between a first stable connecting position and a second stable connecting position wherein the body is turned over and rotated 180° in relation to the arm, so that the mirror functions as a right- or left-hand rearview mirror, depending on whether the body is set to the first or second position.

6 Claims, 2 Drawing Sheets

VEHICLE REARVIEW MIRROR

BACKGROUND OF THE INVENTION

The present invention relates to a vehicle rearview mirror, particularly for motor vehicles.

Known vehicle rearview mirrors comprise a molded cup-shaped body housing a reflecting plate; and an arm extending from the cup-shaped body, and the free end of which is fitted to an outer panel, normally a door portion, of the vehicle.

The rearview mirrors fitted to the right and left side of the vehicle are specular in design, and are formed using different molds.

SUMMARY OF THE INVENTION

It is an object of the present invention to provide a rearview mirror which may be fitted indifferently on the right or left side of the vehicle.

According to the present invention, there is provided a vehicle rearview mirror comprising:
a cup-shaped body having a front edge defining a frame housing a reflecting plate;
an arm extending from a portion of the body, and the free end of which is fitted to an outer panel on the vehicle;
characterized by the fact that the arm presents an end wall mating with the portion;
connecting means being provided between the portion and the end wall, and defining at least two stable connecting positions of the body and the arm;
the body being adjustable in relation to the arm between a first stable connecting position and a second stable connecting position wherein the body is turned over and rotated 180° in relation to the arm.

BRIEF DESCRIPTION OF THE DRAWINGS

A preferred non-limiting embodiment of the present invention will be described by way of example with reference to the accompanying drawings, in which.

DETAILED DESCRIPTION OF THE INVENTION

Figure 1:
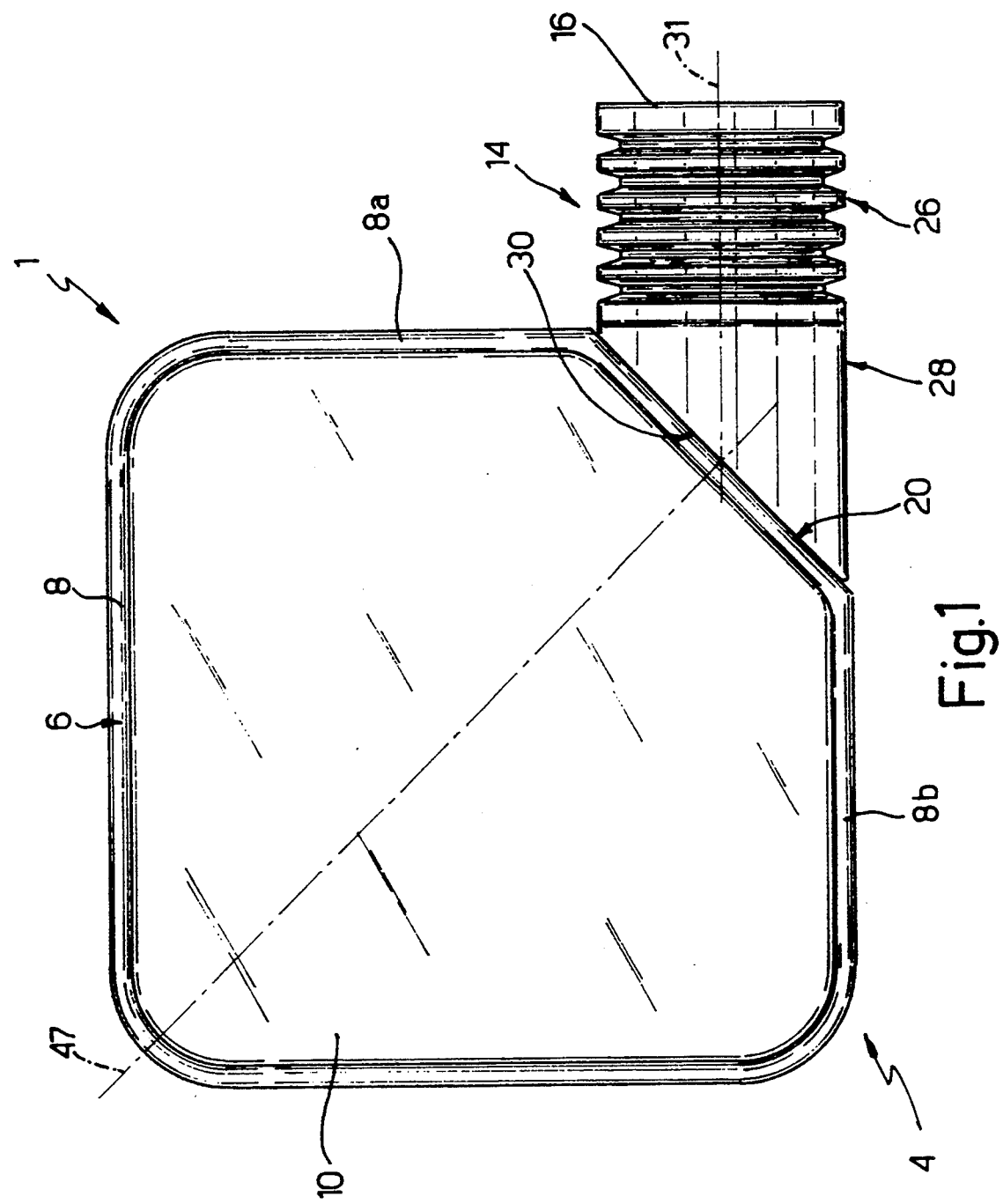
FIG. 1 shows a front view of a rearview mirror in accordance with the present invention.
Figure 2:
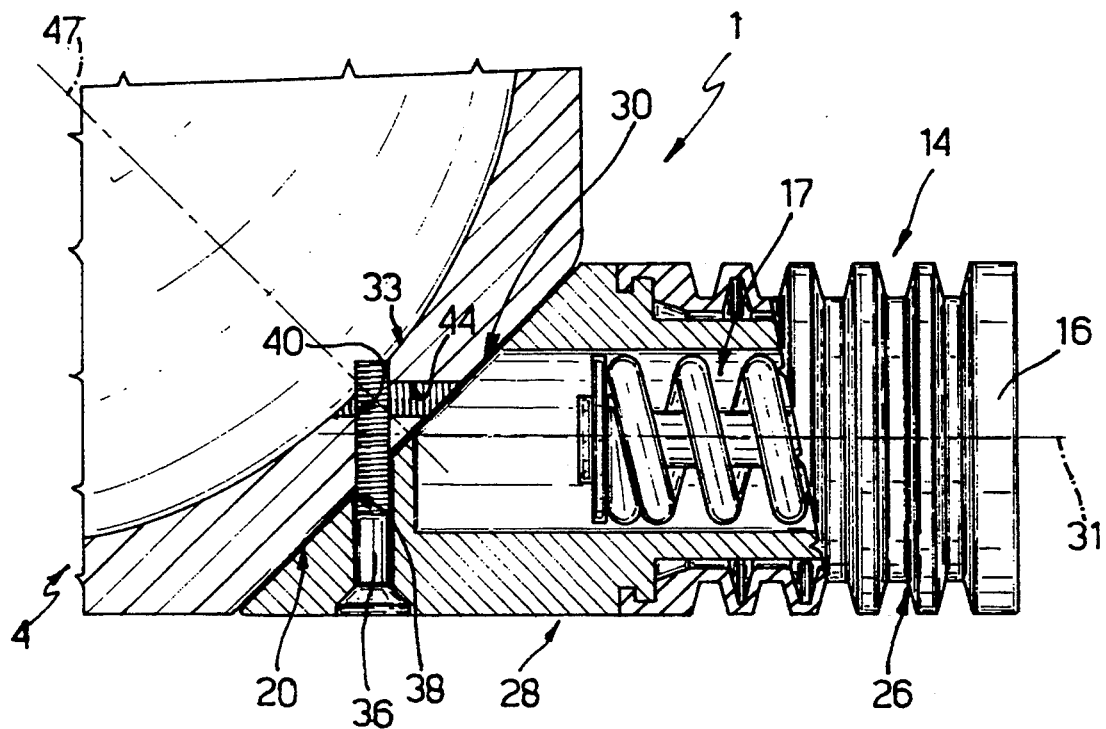
FIG. 2 shows a larger-scale section of a detail on the FIG. 1 mirror.

Number 1 in FIGS. 1 and 2 indicates a vehicle rearview mirror comprising a cup-shaped body 4, the front edge 6 of which defines a frame 8 housing a reflecting plate 10; and an arm 14 extending from body 4, and the free end 16 of which is fitted to the outer panel of the vehicle by means of a known type of articulated joint system 17.

Frame 8 is substantially square, and presents three rounded corners and, at the fourth corner, a bevel defined by a flat wall 20 at an angle of 45° to the adjacent sides 8a and 8b of frame 8.

Arm 14 extends from bevel 20, and is arranged with its bottom edge substantially flush with side 8b of frame 8.

Arm 14 comprises a first bellows portion 26 extending from free end 16 fitted to the outer panel of the vehicle, to a cylindrical portion 28 integral and coaxial with portion 26. Cylindrical portion 28 presents a flat end wall 30 at a 45° angle to the axis 31 of arm 14, arranged contacting flat wall 20, and connected stably to wall 20 by a fastening system 33.

More specifically, fastening system 33 comprises a screw 36 screwed inside a threaded through hole 38 extending, perpendicular to axis 31, from the lateral wall of portion 28 to wall 30, and terminating in a threaded hole 40 formed in body 4 and housing the end portion of screw 36.

System 33 also comprises a second threaded hole 44 formed in body 4, perpendicular to hole 40, and terminating at wall 20.

Body 4 may thus be fitted in two stable positions in relation to arm 14: a first position (FIG. 1) wherein screw 36 is screwed inside holes 38 and 40; and a second position (not shown) wherein body 4 is rotated 180° in relation to the first position and about an axis 47 perpendicular to bevel 20, and screw 36 is screwed inside holes 38 and 44. Thus, depending on whether body 4 is mounted in the first or second position, mirror 1 functions as both a right- and left-hand mirror. Moreover, frame 8 (FIG. 1) is symmetrical in relation to axis 47, which is coplanar with frame 8.

The rearview mirror according to the present invention therefore provides for overcoming the drawbacks of known mirrors by virtue of the same mirror being fittable to the right or left side of the vehicle, and by virtue of providing for fast, troublefree fitment of body 4 to arm 14 when the mirror is fitted to the vehicle.

To those skilled in the art it will be clear that changes may be made to the rearview mirror as described and illustrated herein without, however, departing from the scope of the present invention.

Figure 3:
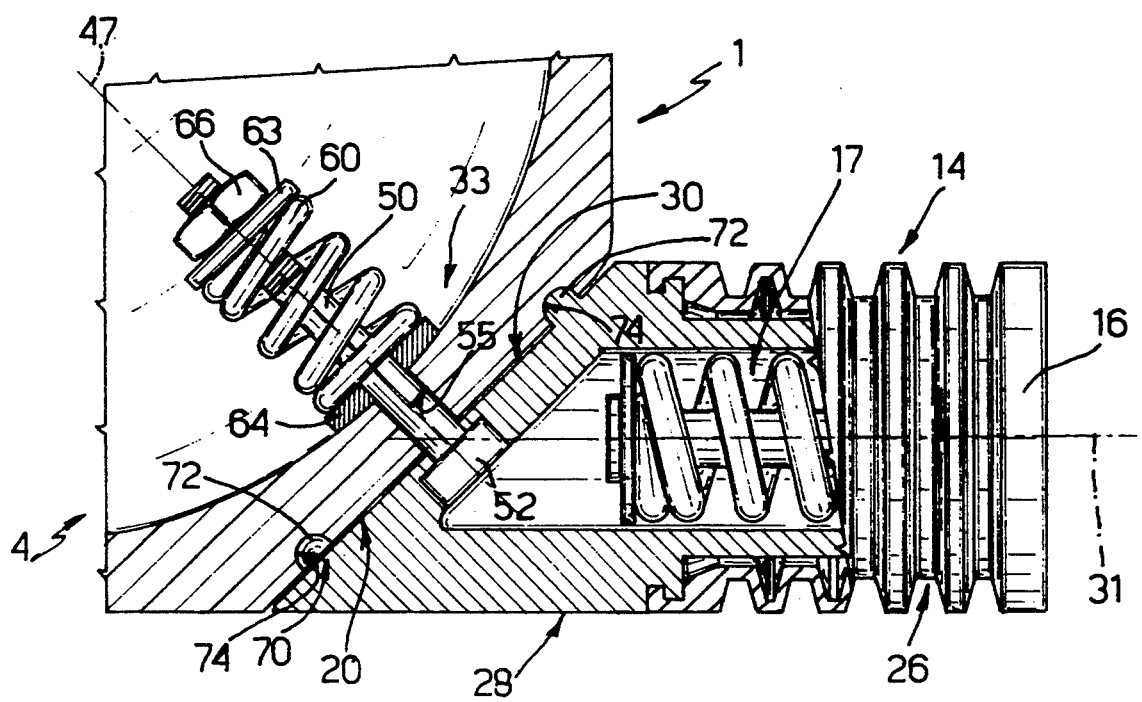
FIG. 3 shows a variation of the FIG. 2 detail.

According to one variation, fastening system 33 (FIG. 3) comprises a screw 50, which is fitted stably with its base 52 inside wall 30, and extends inside body 4 through a hole 55 formed in the lateral wall of body 4. Screw 50 is also positioned at a 45° angle in relation to axis 31, i.e. is coaxial with axis 47, and is fitted with a coaxial helical spring 60 pressed at a first end by a washer 63 fitted close to the end of screw 50 by means of a self-locking nut 66. The second end of spring 60 presses on a washer 64 on the inner surface of wall 20, with such pressure as to enable body 4 to be rotated in relation to arm 14 about screw 50 and into said first and second positions.

Fastening system 33 also presents a stop device 70 comprising a pair of semispherical projections 72 on the outermost surface of wall 30 and on either side of screw 50. Projections 72 extend towards wall 20, and are designed to mate with respective semispherical cavities 74 in wall 20, for preventing body 4 in said first or second position from moving angularly about screw 50.

I claim:
1. A vehicle rearview mirror comprising:
a cup-shaped body (4) having a front edge (6) defining a frame (8) housing a reflective plate (10);
an arm (14) extending from a portion (20) of said body (4), and the free end (16) of which is fitted to an outer panel on the vehicle, said arm (14) presenting an end wall (30) mating with said portion (20);
connecting means (33) being provided between said portion (20) and said end wall (30), and defining at least two stable connecting positions of said body (4) and said arm (14);
said body (4) being adjustable in relation to said arm (14) between a first stable connecting position and a second stable connecting position wherein said body (4) is turned over and rotated 180° in relation to said arm (14);

wherein said frame (8) being substantially square, and presenting, at one corner, a bevel (20); said arm (14) extending from said body (4) at said bevel (20).

2. A mirror as claimed in claim 1, wherein said arm (14) comprises a first bellows portion (26) having a free end (16) designed for fitment to said outer panel of said vehicle; said arm (14) also comprising a cylindrical portion (28) integral and coaxial with said bellows portion (26) and terminating in said end wall (30) mating with said portion (20).

3. A mirror as claimed in claim 2, wherein said end wall (30) is inclined 45° in relation to the axis (31) of said arm (14).

4. A mirror as claimed in claim 1, wherein said connecting means (33) comprise:

a first (40) and second (44) threaded hole formed in said body (4) and the respective axes of which are substantially perpendicular to each other;

a third through hole (38) formed in said arm (14) and extending from a lateral wall of said arm (14) towards said body (4);

a screw (36) engaging said third hole (38) and the end portion of which engages said first (40) or said second (44) hole, depending on whether said body (4) is set to said first or said second position.

5. A mirror as claimed in claim 1, wherein said frame is symmetrical in relation to an axis (47) perpendicular to said portion (20); said axis (47) being coplanar with said frame (8).

6. A vehicle rearview mirror comprising: a cup-shaped body (4) having a front edge (6) defining a frame (8) housing a reflective plate (10);

an arm (14) extending from a portion (20) of said body (4), and the free end (16) of which is fitted to an outer panel on the vehicle, said arm (14) presenting an end wall (30) mating with said portion (20);

connecting means (33) being provided between said portion (20) and said end wall (30), and defining at least two stable connecting positions of said body (4) and said arm (14);

said body (4) being adjustable in relation to said arm (14) between a first stable connecting position and a second stable connecting position wherein said body (4) is turned over and rotated 180° in relation to said arm (14);

said connecting means comprising an elongated body (50) extending from said arm (14) towards and into said cup-shaped body (4), said elongated body comprising a screw (50) fitted by its base (52) to said arm (14) and extending inside said cup-shaped body (4) through a hole (55) formed in said body (4);

elastic means (60) between said elongated body (50) and said cup-shaped body (4), said elastic means comprising a spiral spring (60), stop means (72,74) located between said arm (14) and said cup-shaped body (4), for defining two stable angular connecting positions of said body in relation to said arm (14);

wherein said stop means comprises a pair of semispherical projections (72) extending from a wall of said arm (14) and on either side of said screw (50); said projections (72) being designed to engage respective semispherical cavities (74) formed in said cup-shaped body (4).

* * * * *